No. 657,838. Patented Sept. 11, 1900.
C. H. SHAFFER.
GEARING FOR WASHING MACHINES.
(Application filed Mar. 19, 1900.)
(No Model.)
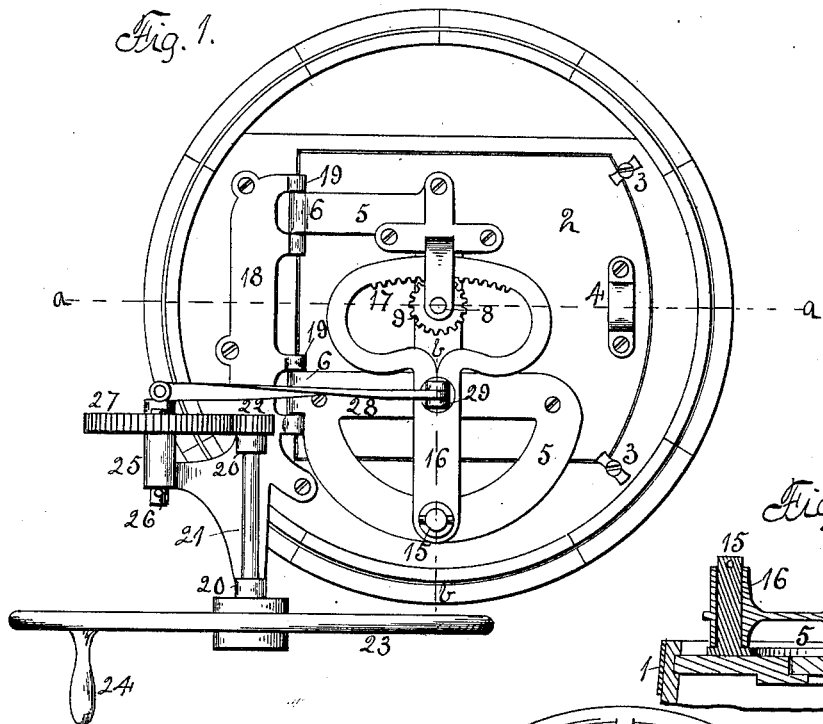
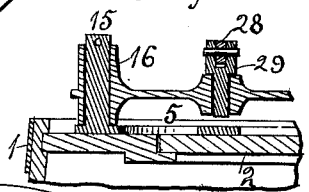
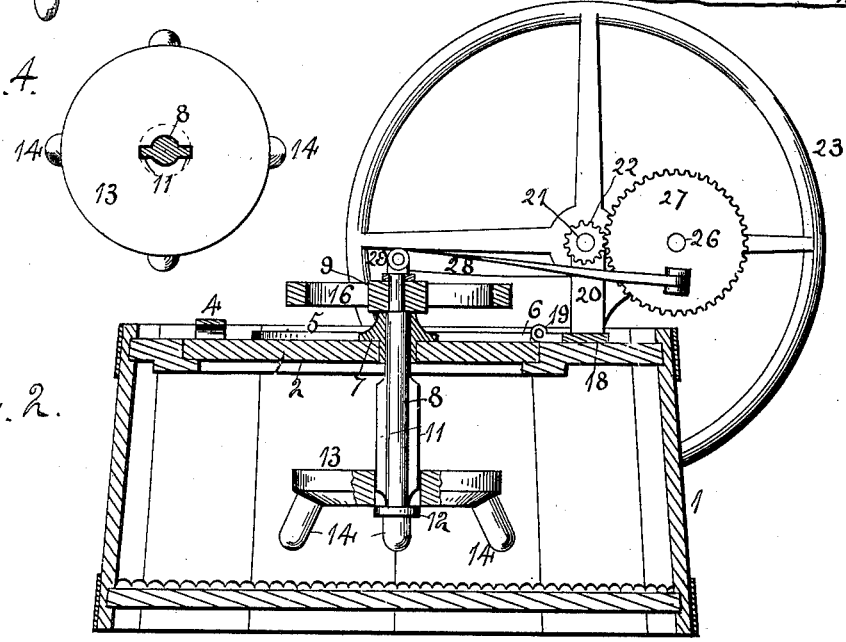
Witnesses:
E. Behel.
M. L. Taylor
Inventor:
Charles H. Shaffer
By A. O. Behel
Atty.

UNITED STATES PATENT OFFICE.

CHARLES H. SHAFFER, OF MUSKEGON, MICHIGAN, ASSIGNOR TO THE MICHIGAN WASHING MACHINE COMPANY, OF SAME PLACE.

GEARING FOR WASHING-MACHINES.

SPECIFICATION forming part of Letters Patent No. 657,838, dated September 11, 1900.

Application filed March 19, 1900. Serial No. 9,222. (No model.)

*To all whom it may concern:*

Be it known that I, CHARLES H. SHAFFER, a citizen of the United States, residing at Muskegon, in the county of Muskegon and State of Michigan, have invented certain new and useful Improvements in Gearing for Washing-Machines, of which the following is a specification.

The object of this invention is to construct a washing-machine in which a reversible rotary movement is imparted to a rubber.

As the invention herein described is particularly applicable to washing-machines, &c., where the work to be performed is necessarily inclosed, but capable of being inspected and of ready removal, I have described the apparatus and its use, as well as illustrated it, as applied to a washing-machine, enabling a readier understanding of the invention.

In the accompanying drawings, Figure 1 is a plan view of my improved washing-machine. Fig. 2 is a vertical central section on dotted line *a*, Fig. 1. Fig. 3 is a vertical section on dotted line *b*, Fig. 1. Fig. 4 is a plan view of the rubber, its support being in transverse section.

The tub or reservoir portion 1 is of any form having a cover 2 held closed by the turn-buttons 3. A loop 4 forms the means by which the cover can be raised. A base-plate 5 is secured to the cover and has perforated extensions 6. From the base-plate 5 rises a tubular boss 7, supporting a shaft 8. The upper end of the shaft supports a toothed pinion 9. The lower portion of this shaft is located within the tub 1 and has side wings 11 and a circular lower end 12. A rubber 13 in circular form has a central opening corresponding in shape to the lower portion of the shaft, and the circular lower end 12 of the shaft prevents the rubber becoming disengaged from the shaft. By means of the wings of the shaft a rotary movement is imparted to the rubber. At the same time it has a self-adjustment in a vertical direction. Projections 14 extend from the lower face of the rubber. From the upper face of the base-plate 5 extends a stud 15, around which is pivoted an arm 16, having its free end provided with a segment of gear 17, the teeth meshing with the teeth of the pinion 9, so that, as the arm is oscillated, a reversible rotary movement will be imparted to the pinion. By placing the pivotal connection of the arm 16 a considerable distance from the segment and placing the stud 29 intermediate, the arc described by the stud during the movement of the arm will be of slight variation from a straight line, so that the connection between the bar 28 and the arm 14 need be but a pivotal one, no provision being required that said connection be a movable one with its tendency of the parts to bind. A bracket 18 is secured to the head of the tub and has ears 19, which receive the perforated extensions 6, and pins passing through the parts form a hinge connection between the bracket and base-plate 5. Supports 20 rise from the bracket and support a shaft 21, to one end of which is secured a toothed pinion 22, and to the other end is secured a balance-wheel 23, having a handle 24 extending therefrom. A support 25 rises from the bracket 18 and supports a shaft 26, to one end of which is secured a toothed wheel 27, which meshes with the teeth of the pinion 22, so that the rotary movement of the balance-wheel will impart a rotary movement to the toothed wheel 27. A connecting-rod 28 has one end connected to the toothed wheel 27, and its other end is connected with the stud 29, pivotally and removably connected to the arm 16, thereby forming a connection between the balance-wheel 23 and the rubber 13. As the balance-wheel is rotated by hand a reciprocating movement will be imparted to the connecting-rod 28, which will impart an oscillatory movement to the arm 16, and it in turn will impart a reversible rotary movement to the rubber 13.

The clothes to be washed are placed within the tub with sufficient water. The rubber will accommodate itself to the quantity of clothes to be washed, and as it is rotated the clothes will be thrown against the sides and bottom of the tub.

In the drawings I have shown the bottom of the inside of the tub provided with corrugations which will assist in cleaning the clothes.

The cover 2 can be raised by means of its hinged connection with the top of the tub, and the end of the rod 28, connected with the yoke 29, may be disengaged therefrom. The rod 28 has a quarter-twist in order that its ends may stand in the different planes to properly connect the parts.

From the foregoing description it will be seen that the path of movement of the arm 16 is at substantially right angles to that of the gear 27. By reason of this fact it will be readily understood that when used in a manner such as shown and described above a positive advantage accrues, in that the cover may be readily raised on its pivot and held substantially locked in its raised position, there being a limit to the opening movement of the cover, yet permitting the cover to be readily lowered into position when desired, the relative position of the parts in such raised position forming an automatic stop, which also serves to prevent any liability of the parts being disarranged or disengaged. A further advantage, however, exists in that the path of movement of the segmental rack lies in a plane at substantially right angles to the shaft which is operated by the rack, thus enabling the movement described to be used at points where it is necessary that the driver operate at substantially right angles to the path of movement of the segmental rack, it being readily understood that the formation of a substantial rack-and-pinion movement insures the proper rotation of the shaft, even though the parts should become slightly loosened, the connection between the rack and pinion also being of greater strength than would be the case were beveled gears used instead. In addition, the fact that by such construction the weight of the arm, &c., lies close to the surface of the cover forms an additional advantage.

I claim as my invention—

In gearing for a washing-machine having a hinged cover, the combination with the shaft 8, having the pinion 9 at its upper end; of the base-plate 5 secured to said cover and extending beyond the lateral bounds thereof to form a stop to limit the closing movement of the cover, said base-plate having the stud 15; the arm 16 removably pivoted at one end to said stud, said arm having its opposite end enlarged and extending beyond said pinion, said enlarged end having an opening, one side of which is formed with a gear-segment to mesh with said pinion; the stud 29 removably and pivotally secured to said arm intermediate the stud 15 and said segment; the gear-wheel 27; the connecting bar or rod 28; and means for imparting movement to said wheel, substantially as and for the purpose set forth.

CHARLES H. SHAFFER.

Witnesses:
 ALEXANDER VAN ZANTEN,
 CHAS. B. W. CUNNINGHAM.